United States Patent
Farrugia et al.

(10) Patent No.: US 8,966,285 B2
(45) Date of Patent: Feb. 24, 2015

(54) SECURING IMPLEMENTATION OF A CRYPTOGRAPHIC PROCESS HAVING FIXED OR DYNAMIC KEYS

(75) Inventors: Augustin J. Farrugia, Cupertino, CA (US); Mathieu Ciet, Paris (FR); Benoit Chevallier-Mames, Paris (FR)

(73) Assignee: Apple Inc., Cupertino, CA (US)

(*) Notice: Subject to any disclaimer, the term of this patent is extended or adjusted under 35 U.S.C. 154(b) by 579 days.

(21) Appl. No.: 12/987,931

(22) Filed: Jan. 10, 2011

(65) Prior Publication Data

US 2012/0179919 A1 Jul. 12, 2012

(51) Int. Cl.
*G06F 11/30* (2006.01)
*G06F 21/60* (2013.01)
*G06F 21/72* (2013.01)
*H04L 9/06* (2006.01)

(52) U.S. Cl.
CPC .............. *G06F 21/602* (2013.01); *G06F 21/72* (2013.01); *H04L 9/0631* (2013.01); *H04L 2209/046* (2013.01); *H04L 2209/16* (2013.01); *H04L 2209/24* (2013.01); *G06F 2221/2107* (2013.01)
USPC ............................ 713/193; 713/189; 380/277

(58) Field of Classification Search
CPC .................. G06F 21/602; G06F 21/72; G06F 2221/2107; H04L 9/0631; H04L 2209/16; H04L 2209/24; H04L 2209/046
USPC ................................................. 713/193, 189
See application file for complete search history.

(56) References Cited

U.S. PATENT DOCUMENTS

| 8,300,805 B1 * | 10/2012 | Langhammer | 380/28 |
| 2008/0285743 A1 * | 11/2008 | Yokota et al. | 380/28 |
| 2009/0097639 A1 * | 4/2009 | Hotta et al. | 380/29 |
| 2010/0080395 A1 * | 4/2010 | Michiels et al. | 380/278 |

* cited by examiner

*Primary Examiner* — Baotran N To
(74) *Attorney, Agent, or Firm* — Adeli LLP

(57) ABSTRACT

In the field of computer enabled cryptography, such as a keyed block cipher having a plurality of rounds, the cipher is hardened against attack by protecting the round keys by (1) combining several cipher operations using a pair of sub-keys (round keys) into one table look-up, or (2) a key masking process which obscures the round keys by providing a masked version of the key operations for carrying out encryption or decryption using the cipher. This approach is especially advantageous in an insecure "White Box" environment where an attacker has full access to execution of the cipher algorithm, including the algorithm's internal state during its execution.

28 Claims, 3 Drawing Sheets

SECURING IMPLEMENTATION OF A CRYPTOGRAPHIC PROCESS HAVING FIXED OR DYNAMIC KEYS

FIELD OF THE INVENTION

This invention relates to data security and cryptography and to improving the security of computer enabled cryptographic processes.

BACKGROUND

In the field of data security, there is a need for fast and secure encryption. This is why the AES (Advanced Encryption Standard) cipher has been designed and standardized. Cryptographic algorithms are widely used for encryption and decryption of messages, authentication, digital signatures and identification. AES is a well known symmetric block cipher. Block ciphers operate on blocks of plaintext and ciphertext, usually of 64 or 128 bits length but sometimes longer. Stream ciphers are the other main type of cipher and operate on streams of plain text and cipher text 1 bit or byte (sometimes one word) at a time. With a block cipher, a particular plain text block will always be encrypted to the same cipher text block using the same key. However, to the contrary with a stream cipher, the same plain text bit or byte will be encrypted to a different bit or byte each time it is encrypted. Hence in the ECB (electronic code book) mode for block ciphers, each plain text block is encrypted independently. In other modes, encryption is a function of the previous blocks.

AES is approved as an encryption standard by the U.S. Government. Unlike its predecessor DES (Data Encryption Standard), it is a substitution permutation network (SPN). AES is fast to execute in both computer software and hardware implementation, relatively easy to implement, and requires little memory. AES has a fixed block size of 128 bits and a key size of 128, 192 or 256 bits. Due to the fixed block size of 128 bits, AES operates on a 4×4 array of bytes. It uses key expansion and like most block ciphers a set of encryption and decryption rounds (iterations). Each round involves the same processes. Use of multiple rounds enhances security. Block ciphers of this type use in each round a substitution box (s-box). This operation provides non-linearity in the cipher and significantly enhances security.

Note that these block ciphers are symmetric ciphers, meaning the same algorithm and key are used for encryption and decryption, except usually for minor differences in the key schedule. As is typical in most modern ciphers, security rests with the (secret) key rather than the algorithm. The s-boxes or substitution boxes accept an n bit input and provide an m bit output. The values of m and n vary with the cipher and the s-box itself. The input bits specify an entry in the s-box in a particular manner well known in the field.

Many encryption algorithms are primarily concerned with producing encrypted data that is resistant to decoding by an attacker who can interact with the encryption algorithm only as a "Black Box" (input-output) model, and cannot observe internal workings of the algorithm or memory contents, etc due to lack of system access. The Black Box model is appropriate for applications where trusted parties control the computing systems for both encoding and decoding ciphered materials.

However, many applications of encryption do not allow for the assumption that an attacker cannot access internal workings of the algorithm. For example, encrypted digital media often needs to be decrypted on computing systems that are completely controlled by an adversary (attacker). There are many degrees to which the Black Box model can be relaxed. An extreme relaxation is called the "White Box" model. In a White Box model, it is presumed that an attacker has total access to the system performing an encryption, including being able to observe directly a state of memory, program execution, modifying an execution, etc. In such a model, an encryption key can be observed in or extracted from memory, and so ways to conceal operations indicative of a secret key are important.

Software implementations of cryptographic building blocks are insecure in the White Box threat model where the attacker controls the execution process. The attacker can easily lift the secret key from memory by just observing the operations acting on the secret key. For example, the attacker can learn the secret key of an AES software implementation by observing the execution of the key schedule algorithm.

Hence there are two basic principles in the implementation of secure computer applications (software or programs). The Black Box model implicitly supposes that the user does not have access to the computer code nor any cryptographic keys themselves. The computer code security is based on the tampering resistance over which the application is running, as this is typically the case with SmartCards. For the White Box model, it is assumed the (hostile) user has partially or fully access to the implemented code algorithms; including the cryptographic keys themselves. It is assumed the user can also become an attacker and can try to modify or duplicate the code since he has full access to it in a binary (object code) form. The White Box implementations are widely used (in particular) in content protection applications to protect e.g. audio and video content.

Software implementations of cryptographic building blocks are insecure in the White Box threat model where the attacker controls the computer execution process. The attacker can easily extract the (secret) key from the memory by just observing the operations acting on the secret key. For instance, the attacker can learn the secret key of an AES cipher software implementation by passively monitoring the execution of the key schedule algorithm. Also, the attacker could be able to retrieve partial cryptographic result and use it in another context (using in a standalone code, or injecting it in another program, as an example).

Content protection applications are one instance where it is desired to keep the attacker from finding the secret key even though the attacker has complete control of the execution process. The publication "White-Box Cryptography in an AES implementation" Lecture Notes in Computer Science Vol. 2595, Revised Papers from the 9th Annual International Workshop on Selected Areas in Cryptography pp. 250-270 (2002) by Chow et al. discloses implementations of AES that obscure the operations performed during AES by using table lookups (also referred to as TLUs) to obscure the secret key within the table lookups, and obscure intermediate state information that would otherwise be available in arithmetic implementations of AES. In the computer field, a table lookup table is an operation using a data structure (the table) to replace a computation with an array indexing operation.

Chow et al. (for his White Box implementation where the key is known at the computer code compilation time) uses 160 separate tables to implement the 11 AddRoundKey operations and 10 SubByte Operations (10 rounds, with 16 tables per round, where each table is for 1 byte of the 16 byte long—128 bit—AES block). These 160 tables embed a particular AES key, such that output from lookups involving these tables embeds data that would normally result from the AddRoundKey and SubByte operations of the AES algorithm, except that this data includes input/output permutations that make it more difficult to determine what parts of these tables represent round key information derived from the AES key. Chow et al. provide a construction of the AES algorithm for such White Box model. The security of this construction resides in the use of table lookups and masked data. The input and output mask applied to this data is never removed along the process. In this solution, there is a need for knowing the key value at the compilation time, or at least to be able to derive the tables from the original key in a secure environment.

The conventional implementation of a block cipher in the White Box model is carried out by creating a set of table lookups. Given a dedicated cipher key, the goal is to store in a table the results for all the possible input messages. This principle is applied for each basic operation of the block cipher. In the case of the AES cipher, these are the shiftRow, the add RoundKey, the subByte and the mixColumns operations.

However, Chow et al. do not solve all the security needs for block cipher encryption in a White Box environment. Indeed, the case where the cipher key is derived through a given process and so is unknown at the code compilation time is not included in Chow et al.

A typical situation not addressed by Chow et al. is when a computer enabled and software based cryptographic process is distributed over several users and each user has his own cipher key; it is, from a practical point of view, impossible to disseminate different software code to each user. Another situation is when generating session keys (which by definition are different for each user session) through a given process. Of course, in this case the key is unknown at the software code compilation time. A last case is when it is necessary to store a very large number of keys.

This disclosure is of two powerful and efficient solutions to harden the extraction of an AES (or other cryptographic) key or keys in a. e.g., White Box environment by means of key hiding processes. Further, the present methods may be used in a more general case of other cryptographic processes. The present disclosure therefore is directed to hiding the key (or keys) in a better way. The first method substitutes a single table look-up (TLU) for four of the conventional cipher operations. The second method protects the keys by a masking operation applied to sub-keys (round keys).

The present systems and methods address especially those cases when the cipher key may be unknown at the software code compilation time or when the code size is limited, and there is a need to harden "dynamically" the process and hide the key to protect against an attacker. This aspect of the present disclosure can be combined with prior existing solutions. The simplest and known existing solution that may be combined with the present processes is to perform data transforms on the key, done to avoid visible removable during the process. So the disclosure is of two independent solutions, but which can be combined, to hide key(s) in a better way.

DETAILED DESCRIPTION

Figure 1:
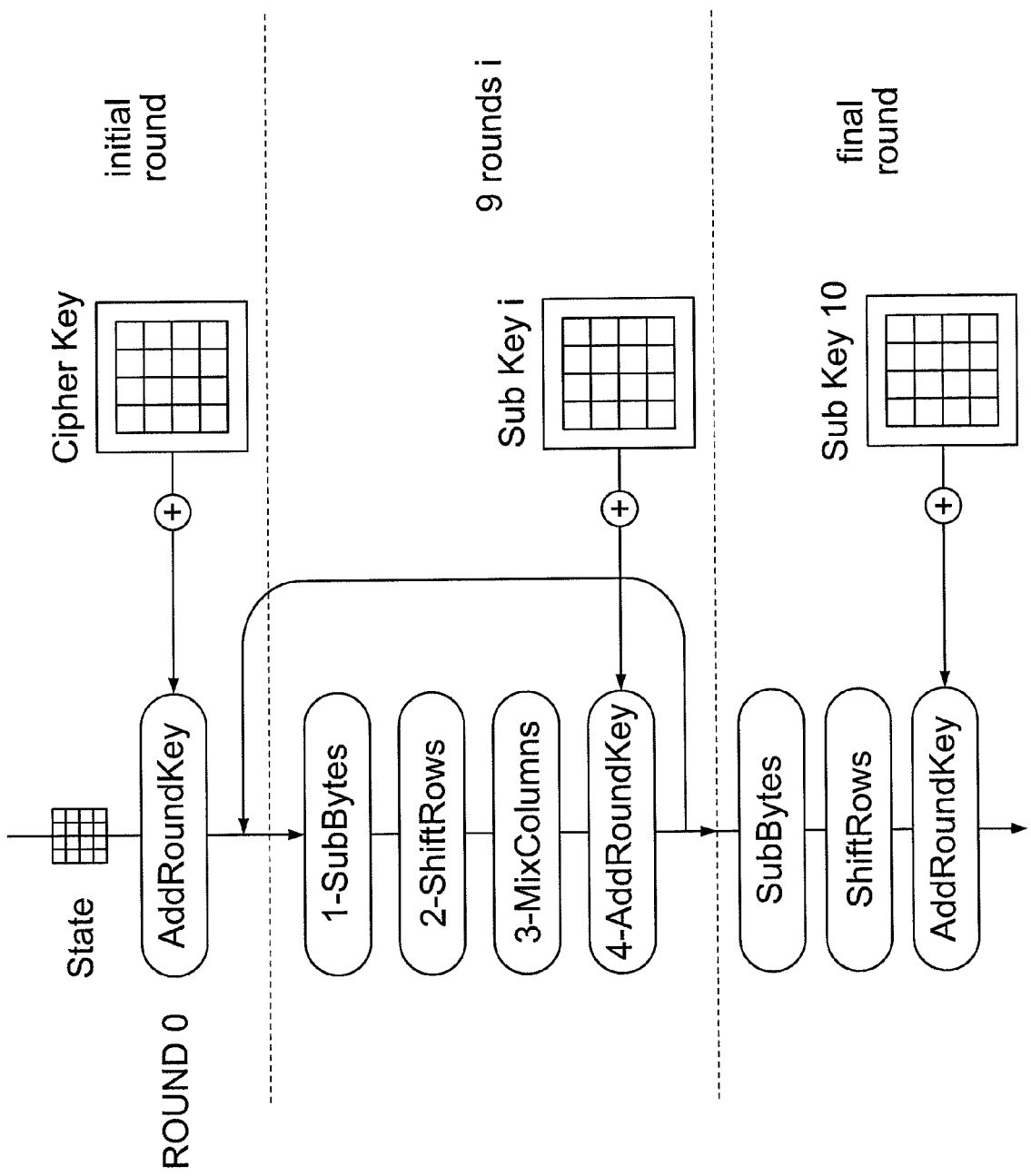
FIG. 1 shows in the prior art operation of the AES cipher.

AES Description
See NIST AES standard for a more detailed description of the AES cipher ("Announcing the Advanced Encryption Standard (AES) ", Federal Information Processing Standards Publication 197 Nov. 26, 2001). The following is a summary of the well known AES cipher. The AES cipher uses a 16 byte long cipher key, and has 10 rounds (final plus 9 others). The entire AES encryption algorithm has the following operations as depicted in prior art FIG. 1 graphically and showing round zero of the 9 rounds:

11 AddRoundKey Operations
10 SubByte Operations
10 ShiftRow Operations
9 MixColumn Operations AES is computed using a 16-byte buffer (computer memory) referred to as the AES "state" in this disclosure and shown in prior art FIG. 1.

To summarize,
(i) AddRoundKeys (ARK) are logically XOR'd (Boolean exclusive OR operation) with some subkey bytes.
(ii) ShiftRows (SR) are a move from one byte location to another.
(iii) MixColums (MC) are a linear table-look up (TLU).
(iv) SubBytes (SB) are a non-linear TLU.

Preliminarily to the encryption itself, in the initial round in FIG. 1, the original 16-byte cipher key is expanded to 11 subkeys designated K0, . . . , K10, so there is a subkey for each round during what is called the key-schedule. Each subkey, like the original key, is 16-bytes long.

The following explains the AES decryption process round by round. For the corresponding encryption process (see FIG. 1), one generally performs the inverse of each operation, in the inverse order. The same is true for the cryptographic processes in accordance with the invention as set forth below. The inverse operation of ARK is ARK itself, the inverse operation of SB is the inverse subbyte (ISB) which is basically another TLU, the inverse operation of MC is the inverse mix column (IMC) which is basically another TLU, and the inverse operation of SR is the inverse shift row (ISR) which is another move from one byte location to another.

Expressed schematically, the AES decryption algorithm is as follows (generally using the inverse of each of the operations in FIG. 1 which for decryption are performed in inverse order from the order of FIG. 1):

ARK (K10)
ISR
ISB
ARK (K9)
IMC
ISR
ISB
ARK (K8)
IMC
ISR
ISB
ARK (K7)
IMC
ISR
ISB
ARK (K6)
IMC
ISR
ISB
ARK (K5)
IMC
ISR
ISB
ARK (K4)
IMC
ISR

ISB
ARK (K3)
IMC
ISR
ISB
ARK (K2)
IMC
ISR
ISB
ARK (K1)
IMC
ISR
ISB
ARK (K0)

Without lack of generality, the description below of the present methods is for the case of decryption, but it is evident that the methods in accordance with the invention can be used also for encryption or other cryptographic processes. The methods in accordance with the invention also can easily be applied to other variants of AES with more rounds (the 192 and 256-bit key length versions) as well as to other block ciphers and more generally to non-block ciphers and other key based cryptographic processes.

Protection for Fixed and Dynamic Cipher Keys

The first example of the first method in accordance with the invention is in the context of a fixed-key White Box version of the AES block cipher, "fixed-key" meaning that the key (or keys) is known (or determined) at the code compilation time. In this case all users would have the same keys. In the content protection context this means that the keys are determined at a server (in a server-client environment) and distributed to all users (the clients). This method may be used also for a dynamic key (key determined at code execution time) version of a block or other cipher. The dynamic key situation is when, e.g., the key(s) are unique to a user or session. In this case the keys typically are dependent on user unique private information.

The goal is to replace any block of cipher operations in each AES round:

ARK (Ki)
ISR
ISB
ARK (Kj)

with a single secure TLU, which thereby hides the cipher sub-keys (round keys) Ki and Kj.

Consider this block of cipher operations for only one byte of the AES state (per FIG. 1 there are 16 bytes in this state, for each of which the behavior is the same). Let x be the AES state byte before performing the block of cipher operations, and Ki and Kj the sub-key bytes that will be applied on this state byte. Then, the ISR operation is just to store the AES state byte in another place in the state, which can be hidden.

In a conventional AES cipher, define variables (each variable is, one byte) u, v, and w for data x (such as a message byte, where the message is a ciphertext for the case of decryption) expressed logically as:

u=x XOR Ki (the first ARK operation in the above block of 4 operations)

v=ISB[u] (the ISB operation)

w=v XOR Kj (the second ARK operation)

where XOR is the Boolean logic exclusive OR operation, which is the effect of the ARK operation.

The present protection method creates (e.g., at the code compilation time, knowing sub-key bytes ki and kj) a table designated PISB (standing for protected ISB) such that:

PISB[x]=ISB[x XOR Ki] XOR Kj

Table PISB is constructed by varying input variable data x (the message byte) over all its possible values, where x is the index of table PISB referencing each value PISB[x]. This table could also be computed in an initialization time, or at the client. This would make things work with not-fixed keys.

Then, the whole four operation block above using Ki, Kj are replaced by a single table look up operation PISB, so w=PISB[x]

The advantages of this solution are it is faster: the original two ARK and the ISB operations are done in a single TLU; more secure: now, the ARK operations and round keys Ki, Kj are hidden, so there is no way for the attacker to look for an XOR with key bytes in the computer code, since the XOR operations are replaced by the table PISB.

A drawback to this solution is the need for several such PISB tables: in fact, since there are 16 bytes of key data, 16 tables (of 256 bytes) are needed to protect the block of operations containing two ARKs. So the present method requires more memory than does the conventional AES algorithm.

As described above, this process protects sub-keys K10 and K9. To protect other couples (consecutive pairs) of the sub-keys, one uses a well known restatement of the conventional AES algorithm. Indeed, it is known that one can replace any AES operation block:

ARK (Ki)
IMC
ISR
ISB
ARK (Kj)
IMC
ISR
ISB by an equivalent series of operations:

IMC
ARK (Ki')
ISR
ISB
ARK (Kj)
IMC
ISR
ISB

This process typically is incorporated into the AES key scheduling algorithm. The sub-key Ki' value is different here, but its computation from sub-key Ki is known in the field, and the security and the behaviour of the algorithm are the same. Ki' is calculated using the linear Ky property of the IMC: IMC (x XOR y)=INC(x) XOR INC(y), so: Ki'=IMC Ki.

So, once one has made this replacement, the present method is applied on the block of operations:

ARK (Ki')
ISR
ISB
ARK (Kj)

That way, one protects any pair of consecutive sub-keys Ki', Kj' of the cipher, which is very powerful. A drawback, once again, is the provision of 16 256-byte tables per pair of sub-keys to be protected. There are 11 sub-keys in a conventional AES cipher, so one can choose 5 pairs of consecutive sub-keys to protect in this manner, and the eleventh sub-key may be protected by another method. Note that this does not change of the round position of any subkey not thereby protected.

This solution can be extended to dynamic (keys determined at code execution time) sub-keys for a White Box model implementation of AES. In this case the PISB tables, or part of the PISB tables, are created (in a client-server environment) on the (secure) server side, or derived from a given key in a secure environment.

Using Properties of the Cipher and Linearity of the mixColumn Operation

The following is an example of a second method to hide cipher keys (including sub-keys) and is adapted (but not limited) to non-fixed (dynamic) keys.

In a White Box implementation of a block cipher, it is known that the sub-keys designated K may be protected by Boolean masks designated M. Masking is a well known process to alter (hide) an original value by mathematically or logically combining the original value with a second value called a mask or mask value. The mathematical or logical operation is such that the original value is readily recovered subsequently from the masked value. A typical such operation is XOR. In this example, a byte Ki of a sub-key is split in two parts designated A, B using a mask byte designated Mi, as follows:

A=Ki XOR Mi
B=Mi and in the cipher algorithm, variables (elements) A and B are used instead of the sub-key byte Ki itself. Of course, the sub-key byte can be split into more than two elements A, B. Other types of masking operations also can be used.

For instance, the conventional ARK operation computation applying key K to message data designated u which is expressed logically as:

v=u XOR K is replaced by v1=u XOR A
v2=v1 XOR B.

To make this more confusing to an attacker, it is known that these operations on variables v1 and v2 may be mixed with other independent operations. This way, it is less evident to the attacker that A and B could be combined together to recover the original sub-key byte K. This confuses the attacker in his understanding of what is carried out by the associated computer code and what are the relations between its elements and/or variables.

The method in accordance with the present invention further is as follows: Select a mask Mi and known in the field, mask the key K by computing:

A=K XOR Mi

Here however, instead of computing B=Mi, in accordance with the invention compute C=IMC(Mi). Indeed, it is known in the AES cipher that for decryption the operation immediately following the ARK operation is an IMC, and the IMC table look-up which implements the IMC operation is linear (by design of the AES cipher). IMC (and its inverse which is mix columns, MC) being a "linear" operation here means logically that:

IMC(X XOR Y)=IMC(X) XOR IMC(Y).

Thus this method for decryption replaces the conventional computation v=u XOR K
w=IMC(v)

by a more confusing (masked) set of computations:

v'=u XOR A
w'=IMC(v'), where IMC(v')=IMC[u XOR A]=IMC[u XOR [K XOR Mi]]
w=w' XOR C, where as above C=IMC (Mi)

which gives the correct result for output W since:

$$w = w' \text{ XOR } IMC(Mi)$$
$$= IMC[u \text{ XOR } [K \text{ XOR } Mi]] \text{ XOR } IMC(Mi)$$
$$= IMC[u \text{ XOR } [K \text{ XOR } Mi] \text{ XOR } Mi]$$
$$= IMC[u \text{ XOR } K]$$

It is much more complicated for the attacker to understand that to attack this version of the cipher he should combine A and the inverse of C (by the IMC operation) to recover the sub-key byte K. The same approach can be used similarly for encryption since, e.g., the MC operations is also linear.

To further express this decryption in terms of the conventional AES cipher operations:

1. Mask the round key byte (or sub bytes) K with a mask value designated Mi to compute the masked round key byte which is designated A:

A=K XOR Mi

2. Perform the ARK (add round key) operation using the masked round key byte A on a message byte designated u, to compute variable V':

V'=u XOR A

3. Perform the (linear) IMC (inverse column mix) operation on variable V' to calculate variable w':

w'=IMC(v')

4. Recover the unmasked result designated w:
   w=w' XOR IMC (Mi) using the same operation IMC here applied to the mask Mi.

Note the identity inherent in step 4 which is: [K XOR Mi] XOR Mi=K.

This of course only substitutes for the conventional ARK and IMC operations in each cipher round—the remainder of each round and the overall decryption process is conventional.

This method may be used in other cases such as encryption using instead of IMC the MC (mix columns) operation which is also linear; the major requirement is that the table embodying the cipher operation (such as the IMC or IM table) is linear as defined above. Note that all the AES cipher operations except for shift byte (SB) and its inverse which is inverse shift byte (ISB) are linear.

Figure 2:
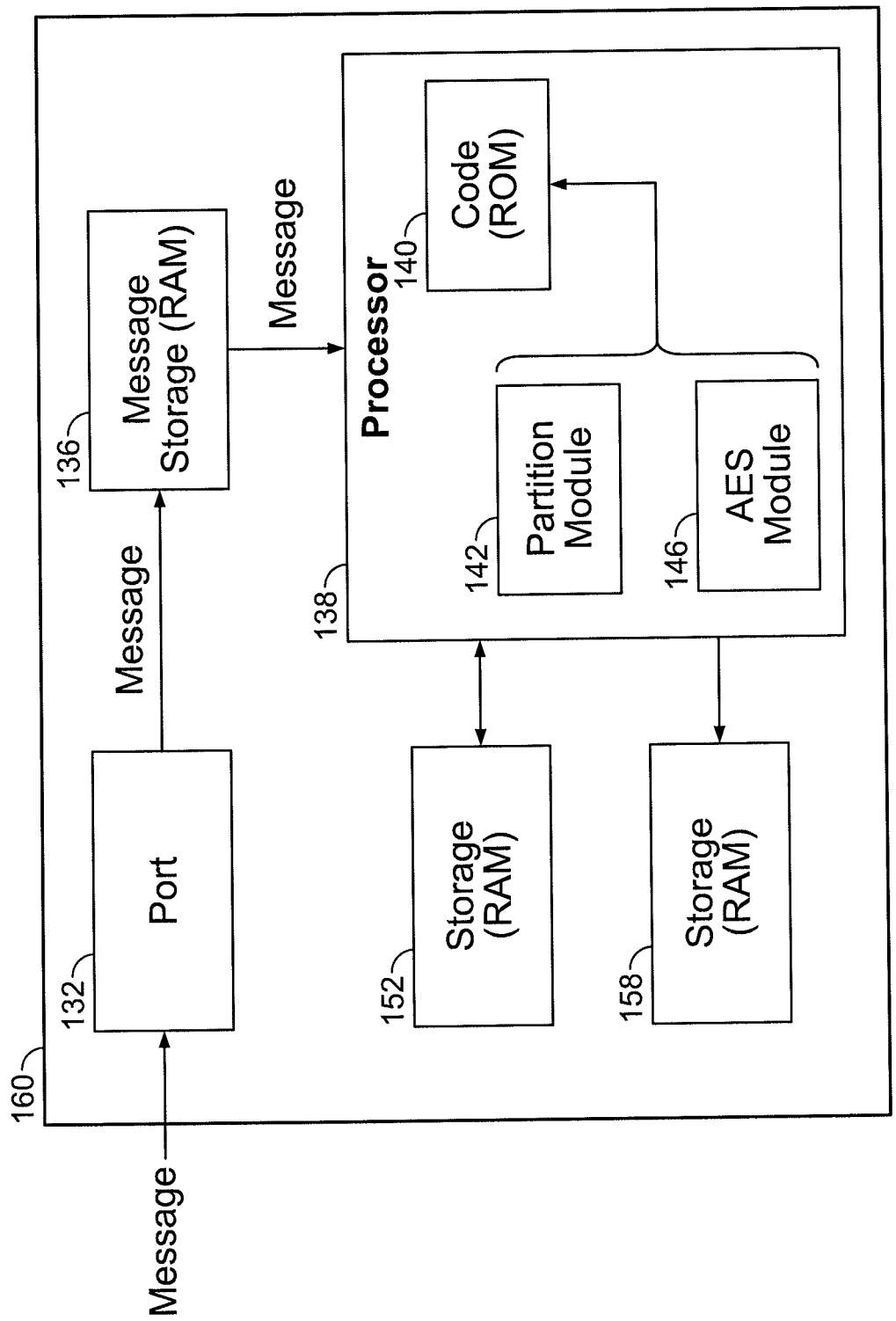
FIG. 2 shows a computing system apparatus in accordance with this invention.

FIG. 2 shows in a block diagram relevant portions of a computing device (system) 160 in accordance with the invention which carries out the cryptographic process as described above. This is, e.g., a server platform, computer, mobile telephone, Smart Phone, personal digital assistant or similar device, or part of such a device and includes conventional hardware components executing in one embodiment software (computer code) which carries out the above examples. This code may be, e.g., in the C or C++ computer language or its functionality may be expressed in the form of firmware or hardware logic; writing such code or designing such logic would be routine in light of the above examples and logical expressions. Of course, the above examples are not limiting. Only relevant portions of this apparatus are shown for simplicity. Essentially a similar apparatus encrypts the message, and may indeed be part of the same computing platform.

The computer code is conventionally stored in code memory (computer readable storage medium) 140 (as object code or source code) associated with conventional processor 138 for execution by processor 138. The incoming ciphertext (or plaintext) message (in digital form) is received at port 132 and stored in computer readable storage (memory 136 where it is coupled to processor 138. Processor 138 conventionally then partitions the message into suitable sized blocks at partitioning module 142. Another software (code) module in processor 138 is the decryption (or encryption) module 146 which carries out the key hiding functionality and decryption (or encryption) functions set forth above, with its associated computer readable storage (memory) 152.

Also coupled to processor 138 is a computer readable storage (memory) 158 for the resulting decrypted plaintext message. Storage locations 136, 140, 152, 158 may be in one or several conventional physical memory devices (such as semiconductor RAM or its variants or a hard disk drive). Electric signals conventionally are carried between the various elements of FIG. 6. Not shown in FIG. 2 is any subsequent conventional use of the resulting plaintext or ciphertext stored in storage 145.

Figure 3:
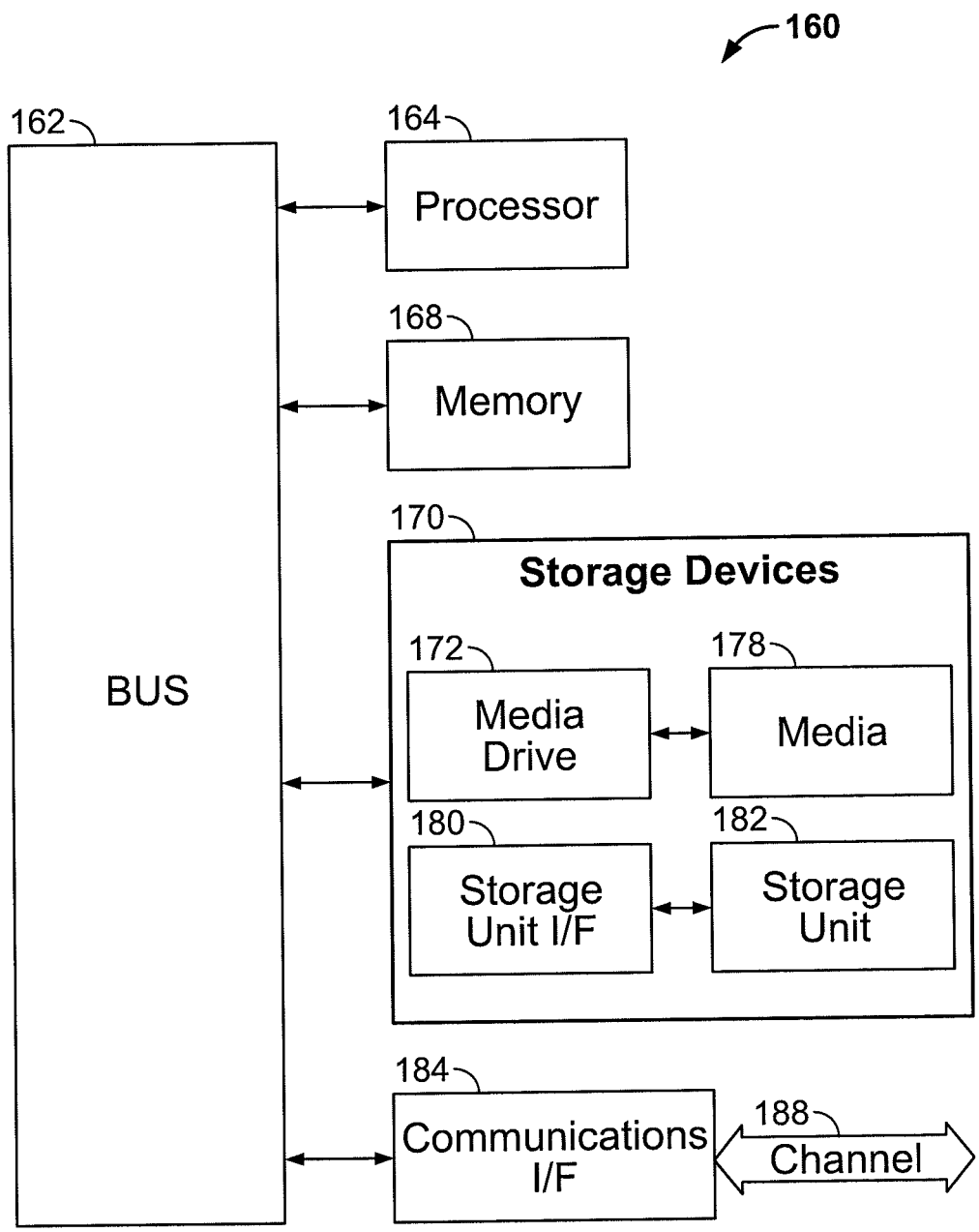
FIG. 3 shows detail of the FIG. 2 system.

FIG. 3 illustrates detail of a typical and conventional embodiment of computing system 160 that may be employed to implement processing functionality in embodiments of the invention as indicated in FIG. 6 and includes corresponding elements. Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor 164 (equivalent to processor 138 in FIG. 6). Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168 (equivalent of memories 136, 140, 152, and 158), such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184 (equivalent to part 132 in FIG. 2). Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method of performing a cryptographic process comprising a plurality of rounds, each round having an associated round key, on a message, wherein each round comprises applying a predetermined set of operations, the method comprising:
   receiving the message;
   generating a key schedule comprising a round key for each round of the cryptographic process;
   for a pair of consecutive rounds of the cryptographic process, generating a table that expresses a subset of the operations of the pair of rounds, wherein the subset of operations expressed in the table comprises add round key operations from each of the pair of rounds that use the round keys associated with each of the pair of rounds;

to perform the set of operations for the two consecutive rounds, applying (i) the generated table and (ii) additional operations of the pair of rounds to a portion of the message to provide a result of the set of operations; and storing an output of the pair of rounds.

2. The method of claim 1, wherein the message is one of plaintext and ciphertext, and the cryptographic process is respectively one of encryption and decryption using a block cipher.

3. The method of claim 2, wherein the block cipher is the AES cipher.

4. The method of claim 1, wherein the round keys are each determined at one of a compilation time and an execution time of computer code for the cryptographic process.

5. The method of claim 1, wherein the cryptographic process has at least 4 round keys, the method further comprising generating, for a different pair of consecutive rounds of the cryptographic process, an additional table that expresses a subset of the operations of the different pair of consecutive rounds.

6. The method of claim 1, wherein the cryptographic process is configured for an insecure environment.

7. The method of claim 1 further comprising generating the round keys from a cipher key.

8. The method of claim 3, wherein the round keys associated with each of the pair of rounds are round keys K9 and K10.

9. The method of claim 1 further comprising:
for each particular pair of rounds of four additional pairs of consecutive rounds of the cryptographic process, generating a table that express a subset of the operations of the particular pair of rounds, wherein the subset of operations expressed in the table comprises add round key operations from each of the particular pair of rounds that use the round keys associated with each of the particular pair of rounds; and
for each particular pair of consecutive rounds, to perform the set of operations for the particular pair of consecutive rounds, applying (i) the generated table for the subset of operations for the particular pair of rounds and (ii) additional operations of the particular pair of rounds to a portion of the message to provide a result of the set of operations.

10. The method of claim 9 further comprising, for an additional eleventh round, performing the set of operations to a portion of the message.

11. A method of performing a cryptographic process for decryption using an AES block cipher on a message, the cryptographic process comprising a plurality of rounds, each round having an associated round key, wherein each round comprises applying a predetermined set of operations, the method comprising:
receiving the message at a port;
storing the received message in a first computer readable storage coupled to the port;
storing the round keys in a second computer readable storage; and
storing a table that expresses a plurality of consecutive operations, including use of two round keys on the message, in a third computer readable storage, wherein the plurality of operations comprises an add round key using a first of two round keys, an inverse shift row, an inverse subbyte, and an add round key using a second of the two round keys.

12. The method of claim 11, wherein the two round keys are designated Ki and Kj, and each table entry has an index designated x, wherein each table entry is calculated as:
ISB[x XOR Ki]XOR Kj, where ISB is the inverse subbyte operation and XOR is the Boolean exclusive OR.

13. A method of performing a cryptographic process for encryption using an AES block cipher on a message, the cryptographic process comprising a plurality of rounds, each round having an associated round key, wherein each round comprises applying a predetermined set of operations, the method comprising:
receiving the message at a port;
storing the received message in a first computer readable storage coupled to the port;
storing the round keys in a second computer readable storage; and
storing a table that expresses a plurality of consecutive operations, including use of two round keys on the message, in a third computer readable storage, wherein the plurality of operations comprises an add round key using a first of the two round keys, a subbyte, a shift row, and an add round key using a second of the two round keys.

14. The method of claim 13, wherein the two round keys are designated Ki and Kj, and each table entry has an index designated x, wherein each table entry is calculated as:
SB[x XOR Ki]XOR Kj, where SB is the subbyte operation and XOR is the Boolean exclusive OR.

15. An apparatus for performing a cryptographic process comprising a plurality of rounds, each round having an associated round key, on a message, wherein each round comprises applying a predetermined set of operations, the apparatus comprising:
a set of processing units for executing sets of instructions;
a computer readable storage storing a program which when executed by at least one of the processing units, the program comprising sets of instructions for:
receiving the message;
generating a key schedule comprising a round key for each round of the cryptographic process;
for a pair of consecutive rounds of the cryptographic process, generating a table that expresses a subset of the operations of the pair of rounds wherein the subset of operations expressed in the table comprises add round operations from each of the pair of rounds that use the round keys associated with each of the pair of rounds;
applying, to perform the set of operations of the two consecutive rounds, (i) the generated table and (ii) additional operations of the pair of rounds to a portion of the message, to provide a result of the set of operations; and
storing an output of the pair of rounds.

16. The apparatus of claim 15, wherein the message is one of plaintext and ciphertext, and the cryptographic process is respectively one of encryption and decryption using a block cipher.

17. The apparatus of claim 16, wherein the block cipher is the AES cipher.

18. The apparatus of claim 15, wherein the round keys are each determined at one of a compilation time and an execution time of computer code for the cryptographic process.

19. The apparatus of claim 15, wherein the cryptographic process has at least 4 round keys, the program further comprising a set of instructions for generating, for a different pair of consecutive rounds of the cryptographic process, an additional table that expresses a subset of the operations of the different pair of consecutive rounds.

20. The apparatus of claim 17, wherein the cryptographic process is decryption, and the subset of operations includes an add round key using a first of two round keys, an inverse shift row, an inverse subbyte, and an add round key using a second of the two round keys.

21. The apparatus of claim 17, wherein the cryptographic process is encryption, and the subset of operations comprises an add round key using a first of the two round keys, a subbyte, a shift row, and an add round key using a second of the two round keys.

22. The apparatus of claim 15, wherein the cryptographic process is configured for an insecure environment.

23. The apparatus of claim 18, wherein the program further comprises a set of instructions for generating the round keys from a cipher key.

24. The apparatus of claim 17, wherein the round keys associated with each of the pair of rounds are round keys K9 and K10.

25. The apparatus of claim 20, wherein the round keys associated with each of the pair of rounds are designated Ki and Kj, and each table entry has an index designated x, wherein each table entry is calculated as:

ISB[x XOR Ki]XOR Kj, where ISB is the inverse subbyte operation and XOR is the Boolean exclusive OR.

26. The apparatus of claim 21, wherein the round keys associated with each of the pair of rounds are designated Ki and Kj, and each table entry has an index designated x, wherein each table entry is calculated as:

SB[x XOR Ki]XOR Kj, where SB is the subbyte operation and XOR is the Boolean exclusive OR.

27. The apparatus of claim 15, wherein the computer readable storage is in one physical memory device.

28. The apparatus of claim 15, wherein the computer readable storage is in a plurality of physical memory devices.

* * * * *